United States Patent [19]
Marietta

[11] 3,838,570
[45] Oct. 1, 1974

[54] DIRECTIONAL CONTROL VALVE
[75] Inventor: Walter E. Marietta, Mentor, Ohio
[73] Assignee: Parker-Hannifin Corporation, Cleveland, Ohio
[22] Filed: Sept. 10, 1973
[21] Appl. No.: 395,969

[52] U.S. Cl.......................... 60/405, 60/428, 91/462
[51] Int. Cl............................................ F15b 20/00
[58] Field of Search ............. 60/403, 404, 405, 428; 91/462

[56] References Cited
UNITED STATES PATENTS
3,747,725   7/1973   Feustel et al. ......................... 60/405

Primary Examiner—Edgar W. Geoghegan
Attorney, Agent, or Firm—Donnelly, Maky, Renner & Otto

[57] ABSTRACT

A directional control valve especially adapted for use as a steering control valve in the power steering circuit of mobile equipment such as a fork lift truck characterized in that valve housing has a valve member movable therein to determine the direction of actuation of the steering cylinder and to determine the speed of actuation of the steering cylinder by defining with the valve housing a variable area meter-out orifice in the return path of fluid flow from the steering cylinder. The valve herein is further characterized in that the housing is formed with two inlet ports, one for connection with a variable displacement pump, and the other for connection with a fixed displacement pump, the arrangement being such that in the event of failure of the variable displacement pump, the steering system may be operated by the fixed displacement pump, the valve housing containing an unloading valve which senses pressure upstream of the meter-out orifice to bypass the excess flow from the fixed displacement pump over and above that flow required to satisfy the demand set by the directional control valve member at the aforesaid variable area meter-out orifice. In the case of the variable displacement pump, the valve housing is provided with a sensing port to sense the pressure drop across the variable area meter-out orifice thereby to adjust the variable displacement pump to supply fluid at a rate as set by the variable area meter-out orifice for actuating the steering cylinder at desired selected speed.

7 Claims, 3 Drawing Figures

PATENTED OCT 1 1974

3,838,570

DIRECTIONAL CONTROL VALVE

BACKGROUND OF THE INVENTION

Power steering circuits in mobile equipment such as a fork lift truck generally employ a power steering pump of the fixed displacement type and the speed of actuation of the power steering cylinder is determined by a variable area orifice set by the movement of a control valve spool to an operating position, the pressure drop across the orifice being sensed by an unloading valve to bypass excess pump flow. Moreover, in known steering control valves, the variable area orifice which is set by the extent of movement of the valve member to an operating position is a meter-in orifice which is in the pressure supply path to the power steering cylinder whereby substantial flow forces are encountered in the setting of the size of the variable area orifice.

SUMMARY OF THE INVENTION

In contradistinction to known directional control valves adapted for power steering control, the present steering control valve is of the four-way closed center type in which the speed of actuation of the steering cylinder is determined by a variable area meter orifice which is of size determined by the extent of movement of the valve member to either of its operating positions, the valve housing being provided with a sensing passage to sense the pressure drop across such meter-out orifice to control the operation of a variable displacement pump and said housing being provided with an unloading valve for steering circuit operation by a fixed displacement pump in the event of failure of the variable displacement pump.

DETAILED DESCRIPTION OF A PREFERRED EMBODIMENT

Figure 1:
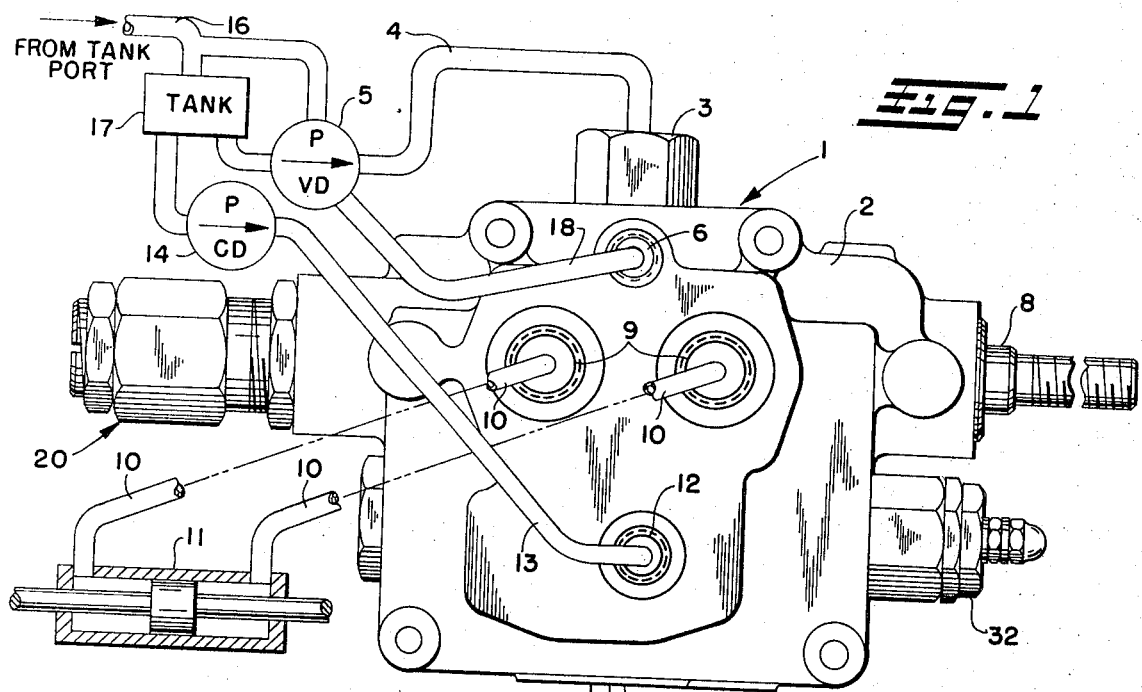
FIG. 1 is an elevation view of the directional control valve herein as connected in a power steering circuit with a variable displacement pump and with a fixed displacement emergency pump.

Referring especially to FIG. 1, the directional control valve 1 herein comprises a housing 2 having a variable displacement pump inlet port 3 connected by conduit 4 to the delivery port of a variable displacement pump 5, a sensing port 6 which senses pressure upstream of a meter-out variable area orifice 7 defined by the valve spool 8 when actuated to either of its two operating positions, steering cylinder ports 9 connected by conduits 10 to the opposite ends of a power steering cylinder 11, a fixed displacement pump inlet port 12 connected by conduit 13 to a fixed displacement pump 14, and a tank port 15 connected by conduit 16 to the tank 17. The conduit 18 from the sensing port 6 leads to the controller on the variable displacement pump 5, said controller being operative in well-known manner to vary the displacement of the pump 5 to maintain a predetermined pressure drop across the variable area meter-out orifice 7 and thereby satisfy the flow demand of said orifice 7 which in turn determines the speed of actuation of the steering cylinder 11.

Figure 2:
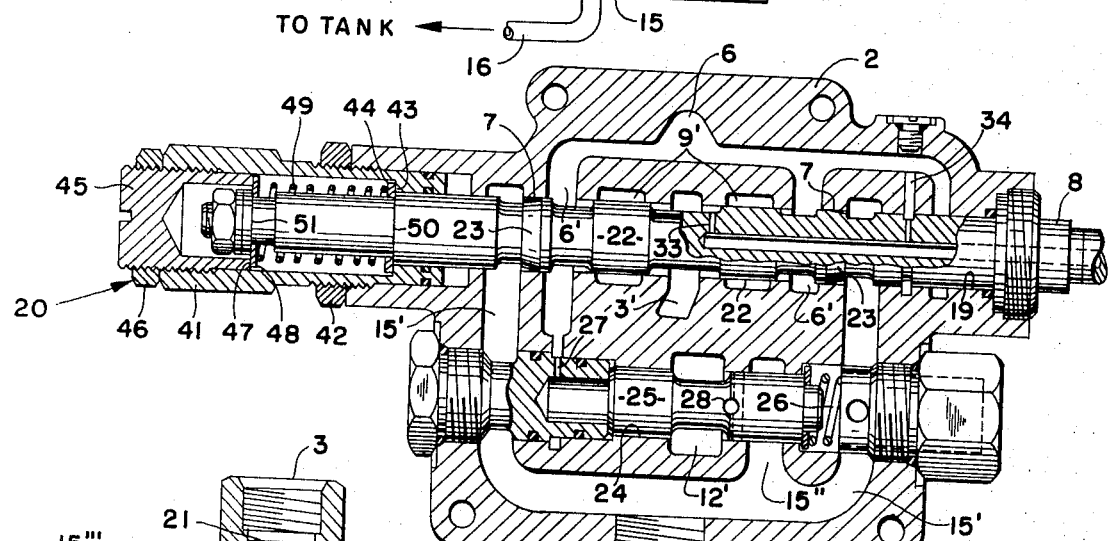
FIG. 2 is a cross-section view passing through the valve spool and unloading valve.
Figure 3:
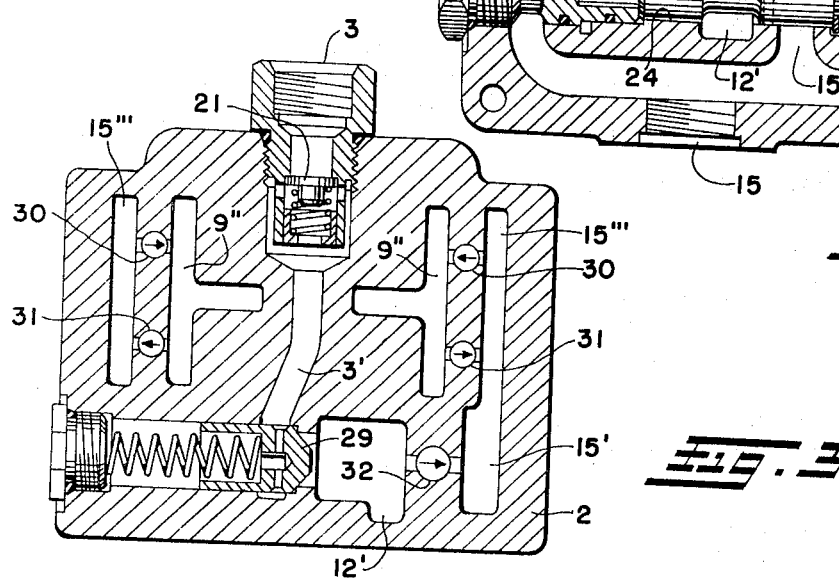
FIG. 3 is a cross-section view in a plane parallel to the cross-section of FIG. 2 but passing through the variable displacement pump inlet port.

Referring now to FIGS. 2 and 3, the housing 2 has a spool bore 19, in which the spool 8 is reciprocable from a closed center neutral position in which it is held by a spring centering mechanism 20. The spool bore 19 is intersected by the inlet passage 3' which communicates with the inlet port 3 by way of the load check valve 21, by a pair of cylinder passages 9' which straddle said inlet passage 3' and which communicate with the respective steering cylinder ports 9, by sensing passages 6' which straddle the cylinder passages 9' and which communicate with the sensing port 6, and by return passages 15' which straddle the respective sensing passages 6' and which communicate with the return port 15. The spool 8 has lands 22 cooperating with the cylinder passages 9' to block both of them when the spool 8 is in neutral position and has metering lands 23 which establish variable area meter-out orifices 7 between the respective sensing and return passages 6' and 15' upon movement of the spool to its respective operating positions.

The housing 2 is provided with an unloading valve bore 24 which is intersected by the fixed displacement pump inlet passage 12' and by the return passages 15' and branch 15''. Movable in said unloading valve bore 24 is an unloading valve member 25 which is biased by the spring 26 to a position closing communication between the inlet and return passages 12' and 15'' when the pressure in the sensing passage 6' is below a prescribed value, the unloading valve member 25 being exposed to return passage 15' pressure at one end and to sensing passage 6' pressure at the other end via the orifice 27. When the pressure in the sensing passage 6' is greater than such predetermined value, the unloading valve member 25 is urged in a rightward direction to bypass excess flow from the inlet passage 12' to the return branch 15'' through metering orifices 28. Between the inlet passages 12' and 3' is a load check valve 29 which prevents reverse flow of fluid from the steering cylinder 11 to the fixed displacement pump inlet passage 12' when the fixed displacement pump 14 is in operation to supply pressure fluid for actuating the steering cylinder 11.

The cylinder-return passages 9' and 15' have extensions 9'' and 15''' as shown in FIG. 3 between which are makeup check valves 30 and overload relief valves 31 whose functions are well known in the art to supply fluid to the steering cylinder 11 to prevent cavitation and to relieve excess pressures which may build up in the return circuit as when the spool 8 is shifted from an operating position to neutral position.

The valve housing 2 also has therein a main relief valve 32 which opens the inlet passage 12' to the return passage 15' when the pressure in the inlet passage 12' exceeds a predetermined value.

When the spool 8 is in neutral position as shown in FIG. 2, the pressure in the sensing passage 6' and port 6 is maintained at a desired value of say 200 psi via a bleed orifice 33 in the spool 8 which registers with an opening 34 in the housing 2 leading to the sensing passage 6' and since at that time there is no flow demand to the steering cylinder 11, the variable displacement pump 5 will be at a minimum displacement position. When the spool 8 is moved to either of its operating positions to establish communication between the inlet passage 3' and either cylinder passage 9', the aforesaid bleed orifice 33 is closed so that there is no loss of fluid flow. When one cylinder passage 9' is communicated with the inlet passage 3', the other cylinder passage 9' is communicated with the adjacent sensing passage 6' and the sensing passage 6' in turn is communicated with the adjacent return passage 15' by way of the variable area meter-out orifice 7 determined by the associated metering land 23, the size of the orifice 7 being determined by the extent of movement of the spool 8 to its operating position. The pump controller for pump 5 then maintains the prescribed pressure drop across the variable area orifice at say 200 psi to satisfy the flow demand and speed of operation of the steering cylinder 11. When the variable displacement pump 5 fails, or when it is only capable of supplying a flow corresponding to say a 100 psi pressure drop across the variable area orifice, the fixed displacement pump 14 may be operated to supply the necessary flow to establish the 200 psi pressure drop so that the steering cylinder 11 may be operated at desired speed. Of course, if the pressure drop increases above 200 psi from the fixed displacement pump 14 the unloading valve member 25 will be actuated to bypass excess flow to the tank 17 from the inlet passage 12' to the return 15". When the fixed displacement pump 14 is utilized for actuation of the steering cylinder 11, the check valve 21 is closed to block flow to the variable displacement pump inlet port 3.

The spring centering mechanism 20 is herein adjustable so that there is no play of the spool 8 when it is in its neutral position. Such adjustment is desirable in the case of a power steering control valve 1 because the seal overlap of the spool lands 22 and 23 with the edges of the spool bore 19 is generally a very small amount such as 0.010 to 0.015 inch. A prevailing practice in the art is to employ shims in the spring centering mechanism 20 to eliminate axial play of the spool 8 when it is in its neutral position but as herein disclosed no shims are required and furthermore precise adjustment may be effected. To that end the housing part 41 has threaded engagement with the housing 2 and is locked in adjusted position by means of the lock nut 42 so that when the spool 8 is accurately centered in its neutral position, the stop shoulder 43 of said part 41 is immediately adjacent the spring follower 44 (preferably with zero clearance). Adjustably screwed into the outer end of said part 41 is another adjustable part 45 which is locked by the lock nut 46 so that its stop shoulder 47 is immediately adjacent the spring follower 48 (preferably with zero clearance) when the spool 8 is in neutral position. In the neutral position of the spool 8, the spring 49 is compressed between followers 44 and 48 with the latter engaging the shoulders 50 and 51 of said spool 8. When the stop shoulders 43 and 47 are adjusted to have zero clearance with followers 44 and 48 when the spool 8 is in neutral centered position, there will not be any axial play and, hence, after the initial 0.010 to 0.015 inch movement of the spool 8 toward either operating position, flow will commence to and from the power steering cylinder 11 with return flow passing from one cylinder passage 9' into the adjacent sensing pasage 6' and from the sensing passage 6' into the adjacent return passage 15' via the variable area orifice 7 defined by the associated metering land 23 of the spool 8 for accurate control of the speed of actuation of the power steering cylinder 11, the size of the variable area meter-out orifice 7 varying according to the extent of movement of the spool 8 from its neutral position beyond the neutral seal overlap position.

It is to be understood that if the directional control valve 1 is used in a system not having the variable displacement pump 5, the inlet and sensing ports 3 and 6 may be plugged together with omission of check valve 21 and, likewise, if the system has no fixed displacement pump 14, the inlet port 12 may be plugged or omitted together with omission of check valve 29, and a plug (not shown) may be installed in the bore 24 in place of the unloading valve member 25 and spring 26. Furthermore, in lieu of the fixed displacement pump 14 (which may be a ground-driven pump driven by travel of the equipment or a pump-tank-valve-motor unit), an accumulator may be employed for safety purposes to enable emergency operation of the power steering system in the event of failure of the variable displacement pump 5.

In summary therefore, it can be seen that the present directional control valve 1 adapted for use as a power steering control valve is of simple full-proof construction which enables proper operation of the power steering cylinder 11 even in cases where the variable displacement pump 5 becomes inoperative.

The embodiments of the invention in which an exclusive property or privilege is claimed are defined as follows:

1. A directional control valve comprising a housing having a bore intersected axially therealong by an inlet passage and by pairs of cylinder, sensing, and return passages, said passages being respectively adapted for connection with both a variable displacement pump and a fixed displacement pump via check valves upstream of said bore, with a double acting power steering cylinder, with both a controller for said variable displacement pump and an unloader for said fixed displacement pump, and with a tank; a valve spool movable in said bore from a neutral position blocking communication between said inlet and cylinder passages and between said sensing and return passages to either of two operating positions communicating said inlet passage with one of said cylinder passages and communicating the other one of said cylinder passages with a return passage via a sensing passage and a variable area orifice between said sensing and return passages of size according to the extent of movement of said spool to either of said operating positions; said directional control valve having a bleed orifice communicating said inlet passage with said sensing passage; and a spring biased unloading valve member in said housing exposed to fluid pressure in said sensing and return passages and being movable by predetermined pressure drop across said variable area metering orifice to bypass excess flow from said fixed displacement pump to said return passage; said inlet passage being normally supplied with fluid under pressure from said variable displacement pump but in the event of failure thereof, fluid under pressure is supplied to said inlet passage by said fixed displacement pump.

2. The directional control valve of claim 1 wherein said pairs of cylinder, sensing, and return passages respectively straddle said inlet passage and each other; and wherein said spool has lands thereon which in the neutral position of the spool block both cylinder passages and has metering lands thereon which in the neutral position of said spool block communication between adjacent sensing and return passages and which in either of said operating positions of said spool establish said variable area metering orifice between adjacent sensing and return passages.

3. The directional control valve of claim 1 wherein said bleed orifice is contained in said spool and is closed when said spool is moved to either of its operating positions.

4. The directional control valve of claim 1 wherein said housing has an unloading valve bore in which said unloading valve member is movable, said unloading valve bore being intersected by said sensing passage, by one of said return passages, and by the inlet passage from said fixed displacement pump upstream of said check valve therein.

5. A directional control valve for a power steering cylinder comprising a housing having a bore intersected axially therealong by inlet, cylinder, sensing, and return passages respectively adapted for connection with a pump, a power steering cylinder, a pump control means, and a tank; a valve spool movable in said bore from a neutral position to an operating position to control fluid flow from said inlet passage to one of said cylinder passages and from the other of said cylinder passages to said return passage via a variable area metering orifice between said sensing and return passages of size according to the extent of movement of said spool to said operating position; said spool having bleed orifice means communicating said inlet and sensing passages with each other, said bleed orifice being closed upon movement of said spool from neutral position to operating position whereby the flow through said variable area metering orifice comprises only the flow of fluid from said other cylinder passage to said return passage via said sensing passage and variable area metering orifice.

6. The directional control valve of claim 5 wherein said pump control means comprises a spring biased unloading valve member in a bore in said housing exposed to fluid pressure in said sensing passage and in said return passage and movable in said bore to bypass excess flow from said inlet passage to said return passage when the pressure drop across said variable area metering orifice exceeds a predetermined value.

7. The directional control valve of claim 5 wherein said pump control means comprises the controller of a variable displacement pump which is exposed to fluid pressure in said sensing passge and in said return passage to maintain a predetermined pressure drop across said variable area metering orifice.

* * * * *